(12) United States Patent
Poplawski

(10) Patent No.: US 9,304,676 B2
(45) Date of Patent: Apr. 5, 2016

(54) MULTI-USE SEGMENTS OF TOUCH SCREEN CONTROL

(71) Applicant: BRAEBURN SYSTEMS, LLC, Montgomery, IL (US)

(72) Inventor: Daniel S Poplawski, Oswego, IL (US)

(73) Assignee: Braeburn Systems, LLC, Montgomery, IL (US)

( * ) Notice: Subject to any disclaimer, the term of this patent is extended or adjusted under 35 U.S.C. 154(b) by 230 days.

(21) Appl. No.: 14/069,602

(22) Filed: Nov. 1, 2013

(65) Prior Publication Data

US 2014/0118285 A1  May 1, 2014

Related U.S. Application Data

(60) Provisional application No. 61/721,147, filed on Nov. 1, 2012.

(51) Int. Cl.
| | |
|---|---|
| *G06F 3/045* | (2006.01) |
| *G06F 3/0488* | (2013.01) |
| *G06F 3/041* | (2006.01) |
| *G06F 3/0484* | (2013.01) |

(52) U.S. Cl.
CPC .............. *G06F 3/0488* (2013.01); *G06F 3/041* (2013.01); *G06F 3/04847* (2013.01)

(58) Field of Classification Search
CPC ....... G06F 3/0488; G06F 3/041; G06F 3/048; G06F 3/04847
USPC ................... 345/173–178; 178/18.01–18.09, 178/20.01–20.04
See application file for complete search history.

(56) References Cited

U.S. PATENT DOCUMENTS

| | | | |
|---|---|---|---|
| 5,983,146 A | 11/1999 | Sarbach | |
| 7,156,318 B1 | 1/2007 | Rosen | |
| 7,302,642 B2 | 11/2007 | Smith | |
| 8,538,588 B2 * | 9/2013 | Kasper | 700/276 |
| 2010/0070089 A1 * | 3/2010 | Harrod et al. | 700/277 |
| 2012/0221149 A1 * | 8/2012 | Kasper | 700/276 |

* cited by examiner

*Primary Examiner* — Vijay Shankar
(74) *Attorney, Agent, or Firm* — Gould & Ratner LLP

(57) ABSTRACT

A display category icon displayed on the display screen is provided in a first segment location, the category icon including one of time, day, temperature, humidity or setpoint category; and each category icon having at least dual functionality including a first function and a second function and the second function programmed to display in sequence following the first function. Control logic allows a user to select a first category icon, then at the next step, the microprocessor can initiate a first function paired to a first category icon. At the next step, the user selects the first category icon again and in response the microprocessor will initiate a second function paired to a first category icon to finish the process.

24 Claims, 6 Drawing Sheets

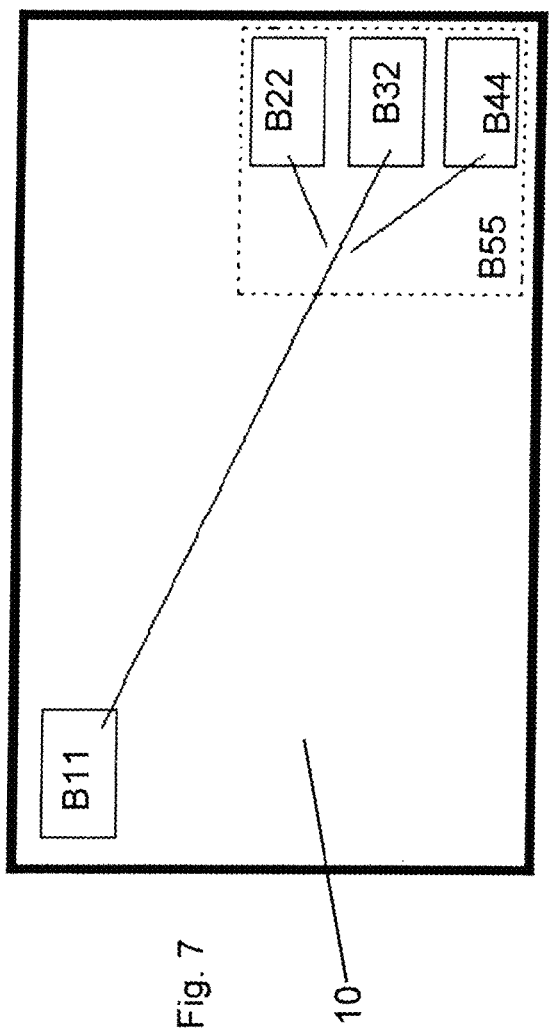
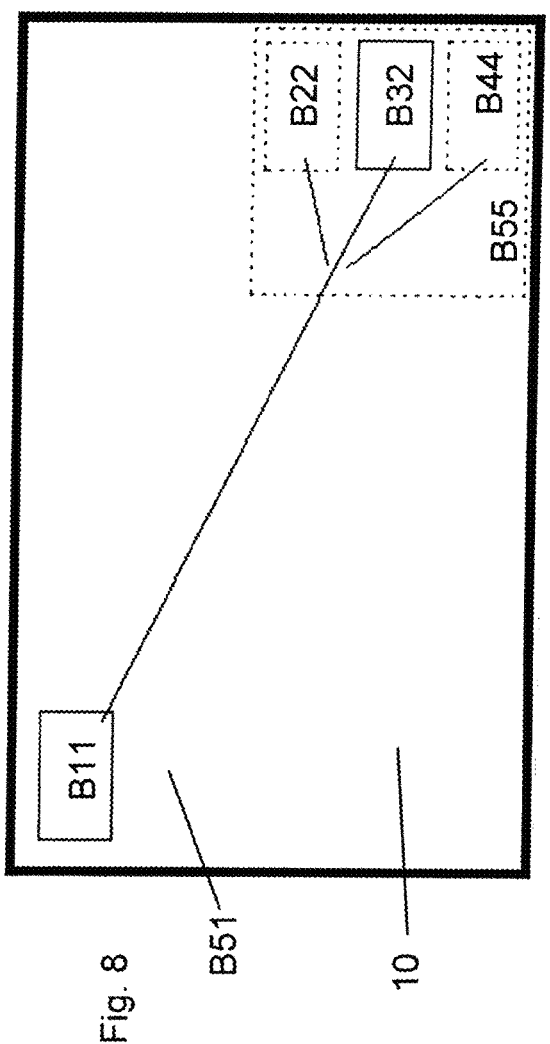

MULTI-USE SEGMENTS OF TOUCH SCREEN CONTROL

This application claims the benefit of provisional application No. 61/721,147 filed Nov. 1, 2012.

This invention is an enhancement to Applicant's previous touch screen technology that allows reduced size touch screens to have the same functionality as full sized touch screens. This functionality is regained in smaller touch screens by making the existing screen icons multi use for related items. As an example, touching the room temperature display may display the outdoor temperature.

This invention addresses issues currently solved with larger more expensive touch screens. As an example, with a large touch screen, real estate is present to have icons for all necessary functions such as Hold, Outdoor Temperature, Heat/Cool/Auto etc. Current economic conditions limit the sales of high cost large screen thermostats. A key cost contributor to a large screen thermostat is the size of the screen. Reducing the size of the touch screen will allow a lower cost product to be sold thus increasing sales velocity. If touch screen size is reduced, icons and text on the screen will need to be commensurately reduced or icons removed, thus reducing functionality. As an alternative, smaller screens may use off-screen buttons or switches to take over functionality of items moved off the screen as screen size was reduced.

The novelty of this invention lies in its cost saving simplicity. When the overall size of a touch screen control has been reduced to save cost, functionality must be preserved. Prior smaller touch screens are shown to have a) reduced functionality; b) smaller overall characters; or c) a mix of touch screen controls and off the touch screen mechanical buttons. Each case has drawbacks in user functionality.

SUMMARY

The present invention provides a display system for an electronic component comprising a touch pad display screen linked to a microprocessor, category icon displayed on the display screen in a first segment location, the category icon including one of time, day, temperature, humidity or setpoint category, and the category icon having at least dual functionality including a first function and a second function and the second function programmed to display in sequence following the first function. In an embodiment, first function is a clock display and the second function is a time set button. In an embodiment, the second function is displayed in the first segment location. In an embodiment, the second function is displayed in a second segment location. In an embodiment, a second segment location is provided that includes at least a primary touch pad button and a secondary touch pad button each programmed so that the secondary touch pad button will display in sequence only after activation of the primary touch pad button.

In an embodiment, the primary touch pad button is displayed in the first segment location while the secondary touch pad button is invisible. In an embodiment, the display is programmed so that during the period that the secondary touch pad button is invisible, the touching of the location of the invisible touch pad button will trigger the primary touch pad button functionality.

In an embodiment, a third segment location is provided including a tertiary touch pad button and the display system programmed to have a preset sequence including the primary touch pad button to be activated prior to the secondary touch pad button prior to the tertiary touch pad button receiving a first touch at the primary touch pad location, and upon receiving a second touch in a segment location other than the preset sequence, the microprocessor will automatically substitute the secondary touch pad button selections in the preset sequence. In an embodiment, the first function is a room temperature display and the second function is an outdoor temperature display. In an embodiment, the first function is a setpoint display and the second function is a program button. In an embodiment, the display includes in combination a first category icon representing a clock display in a first function and a set time button in a second function, a second category icon including a room temperature display as a first function and an outdoor temperature display as a second function, and a third category icon including a set point display as a first function and program button as the second function. In an embodiment, the first, second and third category icons appear in a first segment location on the display and a second segment location on the display including an increment touchpad button for adjusting the category icon either higher or lower, or up or down. In an embodiment, the category icon includes an alphanumeric and the category icon having a third function and a fourth function.

The present invention further provides a display system for an electronic component comprising a touch pad display screen linked to a microprocessor and the display screen including a multi-use segment providing a first function directly associated with the icon displayed at the segment and a second function related to the icon displayed at the segment. In an embodiment, the segment includes an invisible touch pad button for accomplishing the second function. In an embodiment, code instructions are provided for overriding mistaken inputs by a user with respect to adjacent and non-sequential button functions. In an embodiment, the first function is one of a time, day, temperature, humidity or setpoint function. In an embodiment, the second function includes a corresponding function to the first function including a time, day, temperature, humidity or setpoint functionality.

A further invention is provided comprising a display system for an electronic component comprising a touch pad display screen linked to a microprocessor, a first segment location including at least a primary touch pad button and a second segment location including a secondary touch pad button each programmed so that the secondary touch pad button will display in sequence only after activation of the primary touch pad button, the primary touch pad button is displayed in the first segment location while the secondary touch pad button is invisible, and a third segment location is provided including a tertiary touch pad button and the display system programmed to have a preset sequence including the secondary touchpad button as displayed prior to the tertiary touch pad button during the period that the tertiary touch pad button is invisible, the touching of the location of the invisible touchpad button will trigger the secondary touch pad button functionality.

In an embodiment, wherein a first touch is received at the secondary touch pad location; and upon receiving a second touch in a segment location other than the preset sequence, the microprocessor will automatically substitute the tertiary touchpad button selections in the preset sequence. In an embodiment, a category icon is displayed on the display screen in the first segment location, the category icon including one of time, day, temperature, humidity or setpoint category; and each category icon having at least dual functionality including a first function and a second function and the second function programmed to display in sequence following the first function.

In an alternate embodiment, the invention includes a computer program product stored on a non-transitory computerreadable medium, the computer program having computer executable code instructions which are executable on a computer to determine proper functioning of a thermostat, the computer executable code instructions comprising first code instructions for receiving actual input signals with respect to a user's selection of a first touch pad and a second touch pad, second code instructions for reviewing the first and second received signals, comparing with proper functioning of the system and activating the system according to proper input sequence where the second selected signal input is modified to a signal input with respect to a touch pad button adjacent to the actual received input.

In an embodiment, the first code instructions provide for the selection of a time, day, temperature, humidity or setpoint functionality and the second code instructions correspond to the first code instructions with respect to the time, day, temperature, humidity or setpoint functionality. In an embodiment, the modified signal input is based on a near known touch pad button combination. In an embodiment, third code instructions provide a second segment location including at least a primary touch pad button and a secondary touch pad button each programmed so that the secondary touch pad button will display in sequence only after display of the primary touch pad button. In an embodiment, the primary touch pad button is displayed in the second segment location while the secondary touch pad button is invisible.

In an embodiment, the display is programmed so that during the period that the secondary touch pad button is invisible, the touching of the location of the invisible touch pad button will trigger the primary touch pad button functionality. In an embodiment, third code instructions provide a third segment location including a tertiary touch pad button and the display system programmed to have a preset sequence including the primary touch pad button to be activated prior to the secondary touch pad button prior to the tertiary touchpad button, receiving a first touch at the primary touchpad location, and upon receiving a second touch in a segment location other than the preset sequence, the microprocessor will automatically substitute the secondary touch pad button selections in the preset sequence.

BRIEF DESCRIPTION OF THE DRAWINGS

The invention may be more completely understood in consideration of the following description of various embodiments of the invention in connection with the accompanying drawings, in which:

FIGS. 7 and 8 are illustrations of a display screen depicting the second embodiment of the invention.

Figure 1:
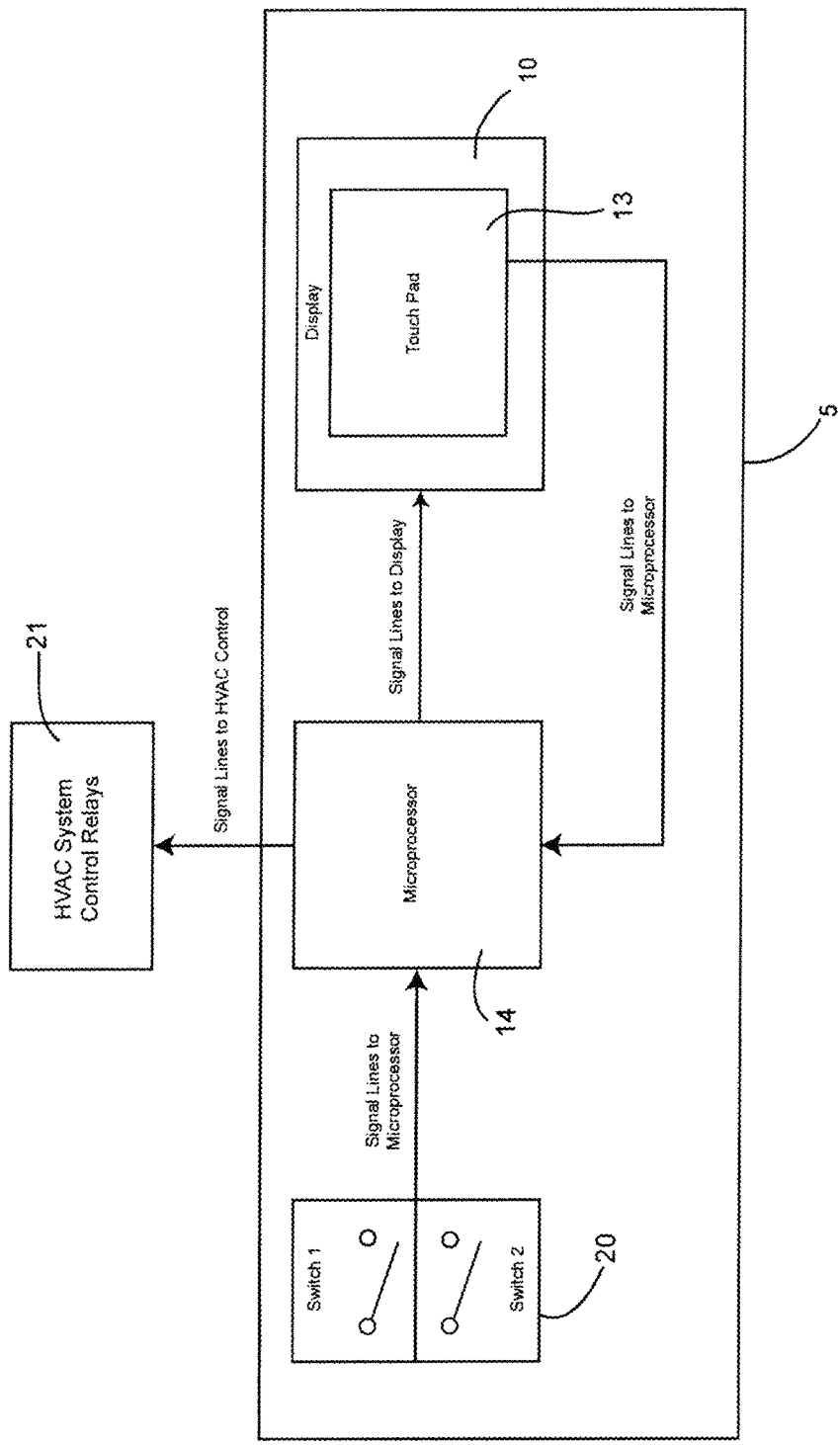
FIG. 1 is a diagram of the components of the invention.

While the invention is amendable to various modifications and alternate forms, specific embodiments have been shown by way of example in the drawings and will be described in detail, it should be understood that the intention is not to limit the invention to the particular embodiments described. The intention is to cover all modifications, equivalents and alternatives falling within the spirit and the scope of the invention.

DETAILED DESCRIPTION

Embodiments of the present invention are depicted with respect to the following FIGS. 1-8. An overview of the electronic circuitry and components of the thermostat 10 of the present invention will be described with respect to FIGS. 1-2. The thermostat 5 includes a display 10 (including touch sensitive area 13), a microprocessor 14 and switch 20. Switch 1 is provided, which may be opened and closed in order to signal the microprocessor 14 (e.g. to increment the selected set-point). As well a Switch 2 is provided which may be opened or closed to signal the microprocessor 14 (e.g. to decrement the selected set-point). The microprocessor controls the HVAC system 21 attached to the thermostat 5 and also is connected to the display 10, which allows for user input to adjust the system. For example, in a typical HVAC system 21, the thermostat 5 would be used to adjust the heating or cooling of the system in order to provide a comfortable environment for the occupants. The microprocessor 14 includes ROM which may have software loaded into it, in order to control the thermostat 5 and to provide for the display screen functionality. The display screen 10 includes displayable touch sensitive areas (see FIG. 2). As will be discussed in greater detail below, the combination of the actuation of Switch 1 and Switch 2 (via the rocker switch 20) and the touch sensitive areas 13 on the display screen 10 allow the microprocessor 14 to monitor and control the air handler HVAC system 21 or any other system to which the thermostat 5 is connected.

Figure 2:
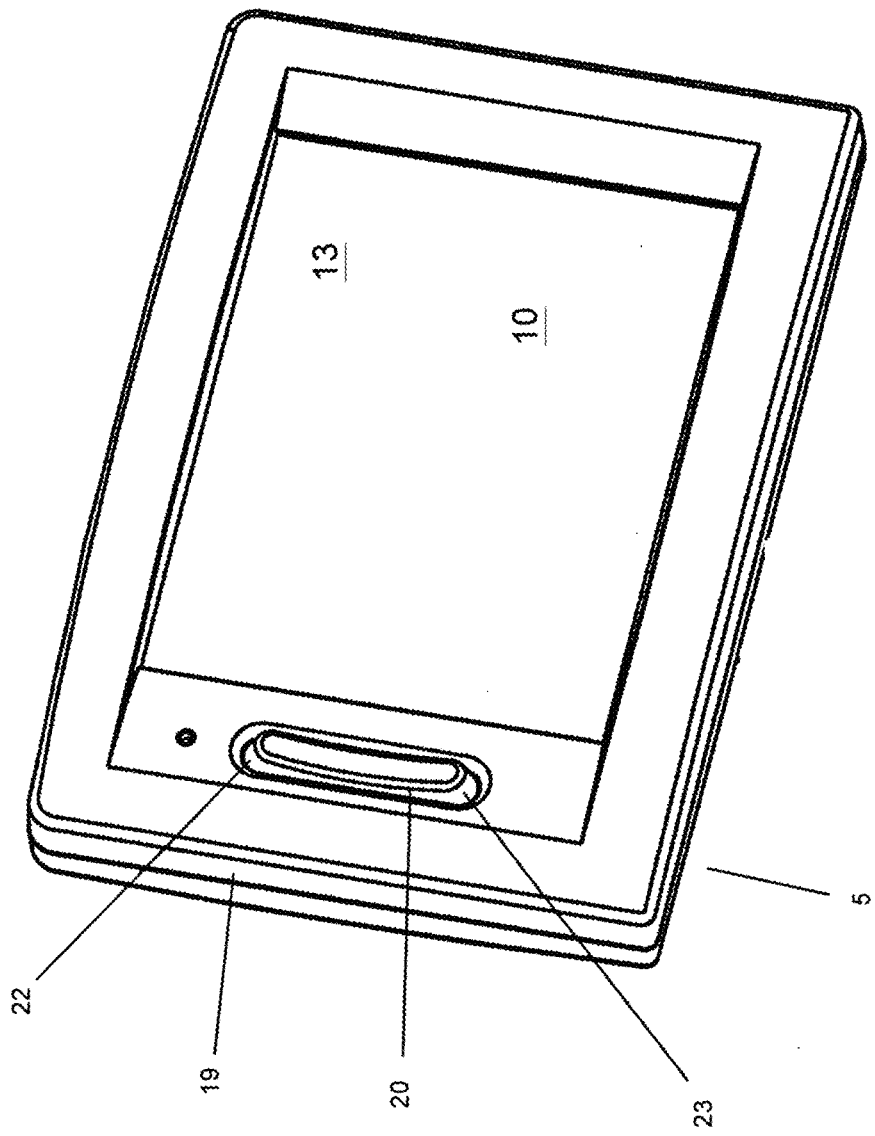
FIG. 2 is a perspective view of a thermostat having a touch pad screen.

The physical construction of the invention is described with respect to FIG. 2 as follows. A thermostat 5 or controller includes a display screen 12 and a printed circuit board mounted within a housing 19 for the microprocessor and other electronic components and circuitry. A rocker switch (mechanical button) 20 is formed of a longitudinal bar having a first end 22 and a second end 23. The thermostat 5 includes a front face. The rocker switch 20 is mounted so that the rocker switch button is exposed in the front face and may be easily operated by a user. As shown in FIG. 2, the thermostat 5 is oriented so that the first end 22 of the rocker switch 20 is oriented at the upper portion of the thermostat 5 and the second end 23 of the rocker switch 20 is located toward the lower portion of the thermostat. In this orientation, the rocker switch 20 may provide for the first end 22 to act as the "up" incrementation or adjustment or a set point and the second end 23 indicates "down" decrementation or adjustment of a set point. The rocker switch 20 may also adjust modes of the thermostat 10 by rocking the switch to the "up" position by depressing the first end 22 or "down" position by depressing the second end 23. A housing 19 supports the rocker switch 20 and display 10.

Figure 3:
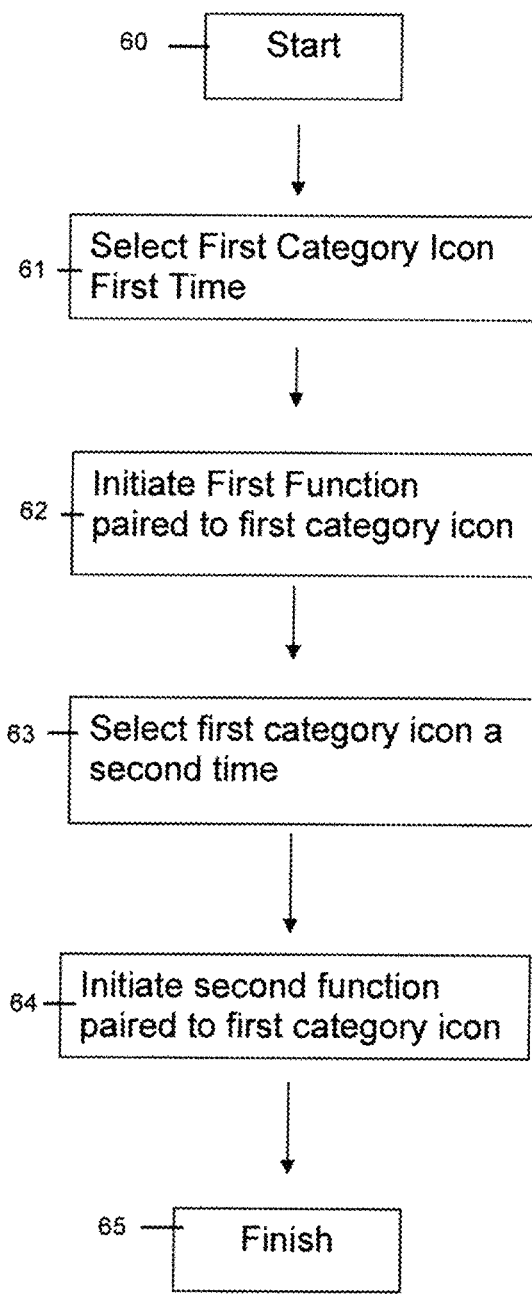
FIG. 3 is a flow diagram of a first embodiment of the invention.

The steps of an embodiment of the invention are depicted in FIG. 3. At the start 60, a user selects a first category icon 61. At the next step 62, the microprocessor can initiate a first function paired to a first category icon. The next step 63, the user selects the first category icon again and in response the microprocessor will initiate a second function paired to a first category icon 64 to finish the process 65.

Figure 4:
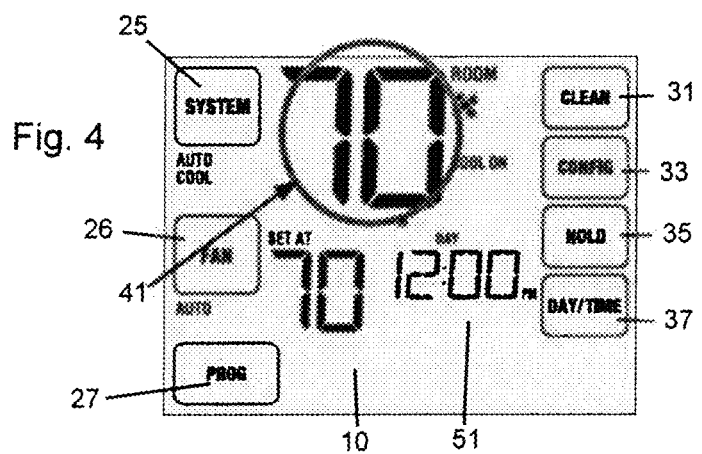
FIG. 4 is an illustration of a display screen that depicts the first embodiment of the invention.

FIG. 4 depicts a display screen 10 of the present invention having visible touch pads displayed on the left and right sides of the display 10 that incorporate the steps discussed above with respect to FIG. 3. For example, on the left side touch pad buttons 25, 26, 27 for "SYSTEM", "FAN" and "PROGRAM" are displayed. On the right side the touch pad buttons 31, 33,

35, 37 for "CLEAN", "CONFIG", "HOLD" and "DAY/TIME" are displayed. These visible touch pad buttons are designated by having a square or rectangle drawn around the alphanumeric designation for that particular button. The present invention also includes invisible touch pad areas that can be activated by a user by touching the pad having an alternate alphanumeric designation or icon (e.g. the second function button for the paired category icon button). For example, as shown in FIG. 4 the room temperature icon area provides temperature category icon 41 (located at multi-use segment 41 of the touchscreen 10) that is depicted with the numeral "70". The temperature category icon 41 for the room temperature (70°) has a dual function of providing a first function providing the room/indoor temperature (70°) and providing a second function for outside temperature.

This invention uses Icons or other segments on the display to initiate an action. Some examples are:
1. Touch the Time display to set the clock (A)
2. Touch Room Temperature to get Outdoor Temperature (B)
3. Touch Setpoint Temperature to enter Setpoint or Programming routine (C)

Typical segments required for clock category icon (A) are 1. Clock Display, 2. Set Time Button, 3. Up Arrow Button, 4. Down Arrow Button. In an embodiment, functions 1 and 2 may be combined in this invention as first and second functions paired with clock category icon (A).

Typical segments required for temperature category icon (B) are 1. Room Temp Display, 2. Display Outdoor Temp Button. In an embodiment, functions 1 and 2 may be combined in this invention as first and second functions paired with the temperature category icon (B).

Typical segments required for setpoint category icon (C) are 1. Setpoint Display, 2. Prog Button, 3. Up Arrow Button, 4. Down Arrow Button. In an embodiment function, 1 and 2 may be combined in this invention as first and second functions paired with setpoint category icon (c). Using A, B and C together saves the real estate required by three standard size touch pad display buttons. In the above examples, each of the functions, A,B,C are represented on the display by category icon. Each category icon includes a first function and second function.

Figure 5:
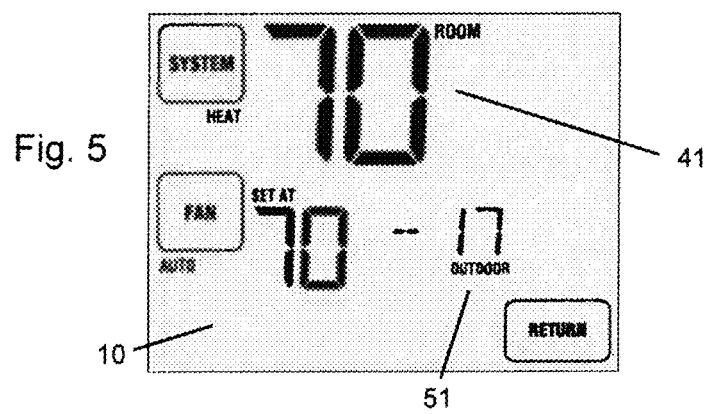
FIG. 5 is a further illustration of a display screen that depicts the first embodiment of the invention.

For example, when a user touches the temperature category icon 41 in the room display area for the room temperature, as shown in FIG. 4, the action will trigger the microprocessor to execute the second function and receive data from the outdoor sensor and receive the current outdoor temperature. As shown in FIG. 5, the outdoor temperature icon 51 ("−17 OUTDOOR") is displayed in the lower right corner of the display 10 as a result of touching the display area for the temperature category icon 41 for room temperature, which has an invisible touch pad button for the second function. It can be understood that real estate on the touch pad display screen 10 can be saved in that a separate button for "outdoor temperature" does not have to be provided on the display screen 10 because the temperature category icon 41 alphanumeric display area has a dual function of providing a first function for room temperature and also providing an invisible touch pad for the second function of outside temperature function. Thus, the temperature category icon 41 display area provides for a multi-use segment of the touch screen display 10.

In another embodiment, the multi-use segment 41 of the touch screen display 10 may provide a third functionality such as displaying the outdoor temperature in degrees Fahrenheit or degrees Celsius. By touching the temperature category icon 41 display area a first time, the first function of degrees are displayed in Fahrenheit is provided. By touching the temperature category icon 41 display area a second time, the second function outside temperature may be displayed in degrees Celsius. Thus, additional real estate may be saved on the display screen because no additional touch pad button to select between degrees Fahrenheit and degrees Celsius would need to be provided on the display 10.

In a further embodiment as depicted in FIG. 4, a time category icon 51 depicting a day time clock display area that presently displays the time of "12:00 p.m." (located on a multi-use segment 51 of the display 10) as the first function may also provide a second function by having an invisible touch pad provided in that area in order to allow for programming of the time set functions of the thermostat. In another example, by touching the setpoint category in icon 37 such as DAY/TIME alphanumeric display area, the user may trigger the first function for setting the time for turning the heat on at a particular temperature. Touching the setpoint category icon 37 for DAY/TIME display a second time would allow the user to implement a second function to enter the time at which the heating function will be turned off during the programming steps.

Touching the setpoint category icon 37 for DAY/TIME display for a third function for a third time that would allow the user to program when the cooling set temperature will begin. Touching the setpoint category icon 37 for DAY/TIME temperature display a fourth time will allow the user to select a fourth function for the cooling temperature off time. Thus, it can be understood that a single category icon such as the DAY/TIME alphanumeric multi-use segment area 37 of the display screen can have at least four functions and thus represent four separate invisible touch pad buttons to activate each of the functions paired to the category icon. Thus, significant real estate is saved on the display screen area because those four touch pad buttons for each of the four functions need not be individually depicted on the display 10.

Figure 6:
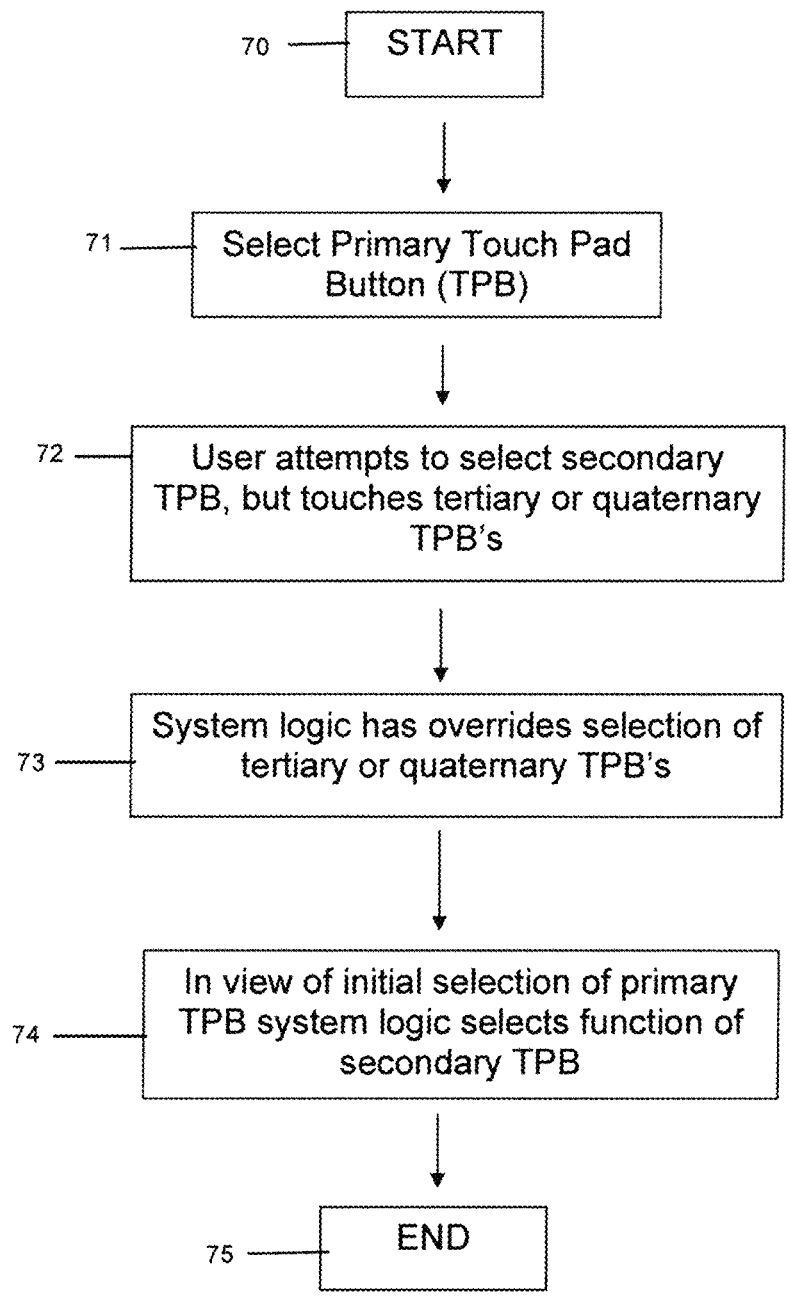
FIG. 6 is a flow diagram depicting a second embodiment of the invention.

Turning to FIGS. 6-8, a further embodiment of the invention is depicted with respect to the functioning of the display screen, software and microprocessor of the system. FIG. 6 depicts the steps of the display system starting at 70 and at the first step 71 a user selects the primary touch pad button. At the next step 72 when a user attempts to select a secondary touch pad button, but touches a tertiary or quaternary touch pad button, then at the next step 73, the system logic of the processor overrides selection of tertiary or quaternary touch pad buttons. At the final step 74, the processor system logic based on the initial selection of the primary touch pad button a secondary function to end the process 75.

FIG. 7 depicts an example of a touch screen display 10 that includes the steps described with respect to FIG. 6. The display 10 includes primary touch pad button B11 in the upper left corner and secondary and tertiary touch pad buttons B22, B32 and quaternary touch pad B44 in the lower right corner. In this example, the specified proper sequence for the user to operate the thermostat would be to touch primary button B11 followed by secondary button B32. For example, the user may be attempting to operate the "system" button B11 and then configure the system by touching "CONFIG" secondary touch pad button B32. In an embodiment primary, secondary, tertiary and quaternary touch pad buttons B11, B22, B32 may provide the functions for SYSTEM, FAN, CLEAN, CONFIG, HOLD, DAY/TIME, TEMPERATURE, HUMIDITY or SETPOINT in any order or combination.

In the example of FIG. 7, there are other touch pad buttons surrounding secondary button B32, such as tertiary touch pad button B22 and quaternary touch pad B44. The operation of the system and arrangement of the buttons on the display allows for the specified proper sequence that culminates by selection of secondary button B32; and never allows for a sequence where tertiary button B22 or quaternary button B44 are selected after the selection of primary touch pad button B11. Therefore, coding for the microprocessor is programmed so that in the instance where tertiary touch pad button B22 is selected after secondary button B32 which is selected after primary button B11, the selection of tertiary button B22 is received by the microprocessor as a command to select the function associated with secondary touch pad button B32. Likewise, if button B44 is selected after secondary touch pad button B32 which is selected after primary touch pad B11, the selection of quaternary button B44 is received by the microprocessor as a command to activate the function associated the secondary button B32.

The operation of the extraneous buttons B22 and B44 may occur when a user is attempting to push the secondary button B32 with their index finger and while secondary button B32 is selected, the user mistakenly presses tertiary or quaternary button B22 or B44 as well. Due to the shrinkage of the size of the overall display screen 10 and the placement of the buttons B22 and B44 in closer proximity to B32 than may be ideal (with respect to the size of a user's index finger), the present invention resolves the issue of stray supplemental touches by providing for system logic to override adjacent but non-specified proper sequence button selection. In other words, tertiary and quaternary buttons B22 and B44 are adjacent secondary button B32; but computer logic and, coding can identify that the operation of the functions for touch pad buttons B22 and B44 are not part of the specified proper sequence of the system for operating the thermostat and overrides such out of sequence selections and substitute the proper secondary button functionality following selection of the primary touch pad button functionality.

As well, it may be that a person's finger is larger than the desired button, B31, and the user places his or her fingertip on both buttons B32 and B22 simultaneously; or buttons B32 and B44 simultaneously. Due to the decreasing size of the touch screen display 10 and the cramped positioning of buttons B22, B32, B44 in a smaller real estate area, it is likely that a user may touch multiple touch pads at the same time. The present invention provides for programming of the microprocessor and/or software to override the selection of tertiary and quaternary touch pad buttons B44 or B22 when the user's finger is placed simultaneously on secondary button B32 and B44 or secondary button B32 and tertiary button B22 simultaneously.

Alternatively, the microprocessor may receive signals that the user has selected primary touch pad button B11 and then quaternary button B44. In this sequence of events, the microprocessor is programmed to substitute the function of secondary button B32 for quaternary button B44 so that the specified proper sequence function for the selection of primary button B11 followed by secondary button B32 is achieved.

Likewise, if the microprocessor receives signals that the user has selected primary touch pad button B11 followed by tertiary button B22, the system will operate as if the user selected primary button B11 followed by tertiary touch pad button B32. Thus, the programming of the system overcomes the problems of misplaced button operation for adjacent touch pads B22, B32. In other words, the programming of the microprocessor includes recognition that button B22 is adjacent, button B32 and the combination of selection of button B11 plus button B22 should be substituted with the selection of the functions of button B11 plus button B32, because the user obviously would want to operate the system properly and the only proper sequence for operation of the system is the functions obtained by selecting buttons B11 followed by button B32.

Turning to FIG. 8, a further embodiment of the present invention is depicted where the tertiary and quaternary touch pad buttons B22 and B42 are not visible. For example, during the operation of the touch screen 10 when primary touch pad button B11 is pressed, tertiary and quaternary buttons B22 and B44 (including alphanumeric indicia and rectangular marking) may disappear leaving only secondary button B32 visible. Thus, in the segment B55 of the touch screen display 10, the area surrounding touch pad button B32 will be blank. Nevertheless, the display screen 10 still includes touch pad sensors in the areas where the buttons B22 and B44 previously were displayed, so that if a user attempts to touch button B32 (but mistakenly places the finger above or below the B32 touch pad), the microprocessor is programmed so that it will operate according to receipt of input signals for the sequence of selecting buttons B11 plus B32. Likewise, if the user actually touches button B32 after selecting button B11 and the user rolls his or her finger off of button B32 towards the invisible button area B22 or the invisible button area B44 (or double touches on either of those invisible button areas), the microprocessor has override code instructions, so that the steps of selecting primary button B11 followed by secondary B32 will still be implemented by the system.

As a further embodiment, the area encompassed by touch pad B55 may be a virtual touch sensitive sector area provided by the display screen 10. The touch pad B55 extends over a second sector of the display screen that includes individual touch pad buttons B22, B32 and B44. The sector touch pad B55 defines a touch sensitive area that encompasses near known valid button combinations. In this embodiment, a selection of primary touch pad button B11 in the first sector B51 plus selection of touch pad sector B55 would be implemented by the microprocessor by substituting the B32 button functionality for the B55 sector selection.

Thus, it may be understood that although the size of the touch screen display 10 may be smaller than previous systems increasing the risk of mispressed buttons due to the smaller size of the touch pad areas and closer populating of the touch pads side by side such issues are alleviated by the present invention which includes touch pad button arrangements and system logic to anticipate and override improper user inputs.

It will be apparent to those skilled in the art that various modifications and variations can be made in touch control screen of alternate embodiments of the invention without departing from the spirit or scope of the invention. Thus, it is intended that embodiments of the invention cover the modifications and variations of this invention provided within the scope of the appended claims and their equivalents.

What is claimed:

1. A display system for an electronic component comprising:
   a segmented touch pad display screen linked to a microprocessor;
   a first segment location including at least a primary touch pad button and a second segment location including a secondary touch pad button each programmed so that the secondary touch pad button will activate only with the primary touch pad button;
   the primary touch pad button is displayed in the first segment location while the secondary touch pad button is in a second segment location; and
   a third segment location is provided including a tertiary touch pad button and the display system programmed to have a preset sequence including the secondary touchpad button adjacent to the tertiary touch pad button during the period that the tertiary touch pad button is active, the touching of the location of the tertiary touchpad button will trigger the secondary touch pad button functionality.

2. The display system of claim 1 whereupon receiving a first touch at the secondary touch pad location; and
upon receiving a second touch in a segment location other than the preset sequence, the microprocessor will automatically substitute the tertiary touchpad button selection in the preset sequence.

3. The display system of claim 1 further comprising:
a category icon displayed, on the display screen in the first segment location, the category icon including one of time, day, temperature, humidity or setpoint category; and
each category icon having at least dual functionality including a first function and a second function and the second function programmed to display in sequence following the first function.

4. The display system of claim 1 wherein the tertiary touchpads are invisible during activation of the primary and secondary touchpad buttons.

5. A display system for an electronic component comprising:
a segmented touch pad display screen linked to a microprocessor the display screen having a first and second segmented area;
a category icon displayed on the display screen in a first segment location in the first segmented area, the category icon including one of time, day, temperature, humidity or setpoint category;
the category icon having at least dual functionality including a first function and a second function and the second function programmed to display in sequence following the first function; and
wherein the category icon displayed as the second function is in the same category as the first function.

6. The display system of claim 1 wherein the first function is a clock display and the second function is a time set button.

7. The display system of claim 1 wherein the second function is displayed in the first segment location.

8. The display system of claim 1 wherein the second function is displayed in the second segmented area.

9. The display system of claim 1 comprising the second segmented area including at least a primary touch pad button and a secondary touch pad button each programmed so that the secondary touch pad button will display in sequence only after activation of the primary touch pad button.

10. The display system of claim 9 wherein the primary touch pad button is displayed in the first segmented area while the secondary touch pad button is invisible.

11. The display system of claim 10 wherein the display is programmed so that during the period that the secondary touch pad button is invisible, the touching of the location of the invisible touch pad button will trigger the primary touch pad button functionality.

12. The display system of claim 1 wherein a third segment location is provided including a tertiary touch pad button and the display system programmed to have a preset sequence including the primary touch pad button to be activated prior to the secondary touch pad button prior to the tertiary touch pad button;
receiving a first touch at the primary touch pad location;
upon receiving a second touch in a segment location other than the preset sequence, the microprocessor will automatically substitute the secondary touch pad button selections in the preset sequence; and
wherein the category icon displayed as the second function is in the same category as the first function.

13. The display system of claim 1 wherein the first function is a room temperature display and the second function is an outdoor temperature display.

14. The display system of claim 1 wherein the first function is a setpoint display and the second function is a program button.

15. The display system of claim 1 wherein the display includes in combination a first category icon representing a dock display in a first function and a set time button in a second function;
a second category icon including a room temperature display as a first function and an outdoor temperature display as a second function; and
a third category icon including a set point display as a first function and program button as the second function.

16. The display system of claim 15, where in the first, second and third category icons appear in the first segmented area on the display and the second segmented area on the display including an increment touchpad button for adjusting the category icon either higher or lower, or up or down.

17. The display system of claim 1 wherein the category icon includes an alphanumeric and the category icon having a third function and a fourth function.

18. A display system for a thermostat comprising:
a segmented touch pad display screen linked to a microprocessor, the display screen having a first and second segmented area and the display screen including a multi-use segment located in the first segmented area, the multi-use segment providing a first function associated with the icon displayed at the multi-use segment and a second function associated with the icon displayed at the multi-use segment;
wherein the icon displayed as the second function is in same category as the first function.

19. The display system of claim 18 wherein the segment includes an invisible touch pad button for accomplishing the second function.

20. The display system of claim 18 providing code instructions for overriding mistaken inputs by a user with respect to adjacent and non-sequential button functions.

21. A display system of claim 18 wherein the first function is one of a time, day, temperature, humidity or setpoint function.

22. The display system of claim 18 wherein the second function includes a corresponding function to the first function including a time, day, temperature, humidity or setpoint functionality.

23. The display system of claim 1 wherein the display is segmented by one of a visible segmented area and an invisible segmented area and the first segmented area having a first touch sensitive area distinct from a second touch sensitive area for the second segmented area.

24. The display system of claim 23 wherein the visible segmented area having a geometric shape formed using ink or pixels on the display including one of a square, rectangle or circle drawn around the segmented area.

* * * * *